United States Patent [19]
William

[11] Patent Number: 5,939,860
[45] Date of Patent: Aug. 17, 1999

[54] CELLULAR PHONE CHARGING AND POWER SYSTEM

[76] Inventor: Brendon William, 2802 NW. 60 Ter., #160, Sunrise, Fla. 33313

[21] Appl. No.: 09/135,824

[22] Filed: Aug. 18, 1998

[51] Int. Cl.⁶ .................................................. H02J 7/00
[52] U.S. Cl. ........................................... 320/114; 320/115
[58] Field of Search ................................... 320/107, 114, 320/115

[56] References Cited

U.S. PATENT DOCUMENTS

| | | | |
|---|---|---|---|
| 4,389,608 | 6/1983 | Dahl et al. | 320/137 |
| 5,136,229 | 8/1992 | Galvin | 320/2 |
| 5,223,780 | 6/1993 | Hu | 320/14 |
| 5,317,247 | 5/1994 | Chong et al. | 320/2 |
| 5,592,064 | 1/1997 | Morita | 320/2 |
| 5,625,271 | 4/1997 | Shapiro et al. | 320/2 |
| 5,635,817 | 6/1997 | Shiska | 320/105 |
| 5,640,077 | 6/1997 | Gillissen et al. | 320/150 |
| 5,648,712 | 7/1997 | Hahn | 320/111 |
| 5,847,541 | 12/1998 | Hahn | 320/111 |

Primary Examiner—Peter S. Wong
Assistant Examiner—Gregory J. Toatley, Jr.
Attorney, Agent, or Firm—Henderson & Sturm

[57] ABSTRACT

A cellular phone charging and power system comprising a base unit connectable to a power source of a building with an electrical cord and converting electronics provided therein outputting a voltage level sufficient to recharge and/or power a cell phone therefrom. The predetermined voltage output is provided through a cord that is wound onto a rewind spool for allowing a user to pull out a length of power cord while using the power supply in the building.

3 Claims, 1 Drawing Sheet

CELLULAR PHONE CHARGING AND POWER SYSTEM

CROSS REFERENCE TO RELATED APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

BACKGROUND OF THE INVENTION

1. Field of the Invention

The present invention relates to the field of battery chargers, and more particularly to a battery charger for charging and powering a cellular phone.

2. Description of Related Art

As can be seen by reference to the following U.S. Pat. Nos. 5,136,229; 5,223,780; 5,317,247; 5,592,064; 5,625,271; and 5,640,077, the prior art is replete with myriad and diverse battery chargers.

While all of the aforementioned prior art constructions are more than adequate for the basic purpose and function for which they have been specifically designed, they are uniformly deficient with respect to their failure to provide a simple, efficient, and practical battery charger and phone powering system.

As a consequence of the foregoing situation, there has existed a longstanding need for a new and improved battery charger and phone powering system and the provision of such a construction is a stated objective of the present invention.

BRIEF SUMMARY OF THE INVENTION

Briefly stated, the present invention provides a cellular phone charging and power system comprising a base unit connectable to a power source of a building with an electrical cord and converting electronics provided therein outputting a voltage level sufficient to recharge and/or power a cell phone therefrom. The predetermined voltage output is provided through a cord that is wound onto a rewind spool for allowing a user to pull out a length of power cord while using the power supply in the building.

BRIEF DESCRIPTION OF THE SEVERAL VIEWS OF THE DRAWINGS

These and other attributes of the invention will become more clear upon a thorough study of the following description of the best mode for carrying out the invention, particularly when reviewed in conjunction with the drawings, wherein.

DETAILED DESCRIPTION OF THE INVENTION

Figures 1, 2:
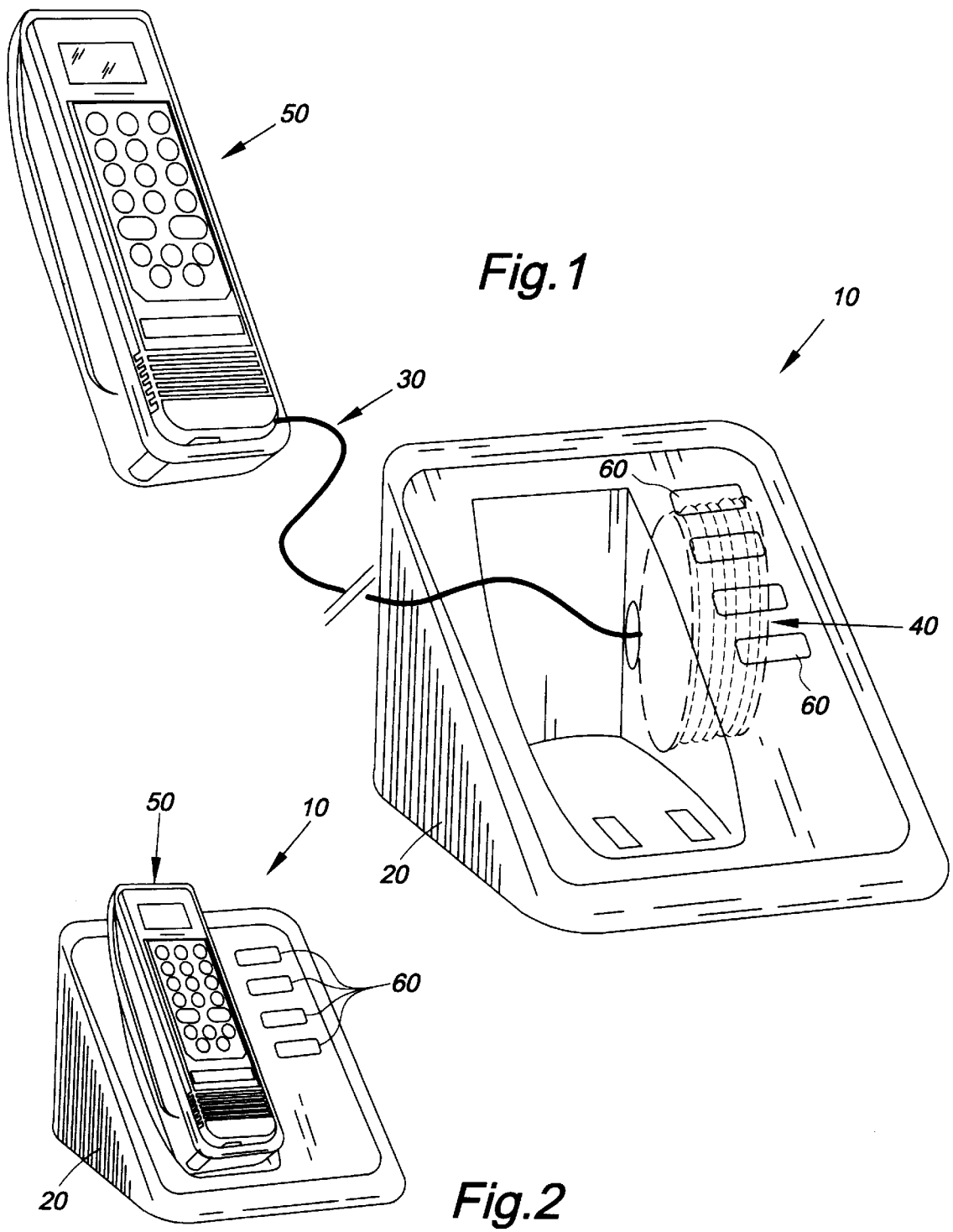
FIG. 1 is a perspective view of the cellular phone charging and powering system of the present invention showing the phone in use.
FIG. 2 is a perspective view of the system showing the phone when not in use.

As can be seen by reference to the drawings, and in particularly to FIG. 1, the phone charging and powering system that forms the basis of the present invention is designated generally by the reference number 10. The system 10 includes a 12 volt DC charging cradle 20 with a power extension cord 30 mounted on an internal spring loader spool 40. An adapter of a universal shape compatible with most cellular phone recharge ports, or a series of specifically shaped adapters may be used to electrically connect the cord 30 to the cellular phone 50. Along one side of the charging cradle 30, a series of indicator lights 60 including the imprinted indicia "charging", "in progress", and "charged" show the current phone condition.

In use, the charging cradle 30 is plugged into a conventional wall receptacle of a building. The spool wound recharging cord 30 is then plugged into the jack of the phone 50 using an appropriate adapter. The phone 50 is then placed in the cradle 20 as illustrated in FIG. 2. Should the user receive or wish to make a call from the cellular phone 50, it is simply removed from the cradle 20, as shown in FIG. 1, and used without draining the battery supply.

The system 10 of the present invention allows use of the cellular phone 50 in the same manner as a residential or business corded telephone The user will not miss calls because of charging dead batteries, nor will calls be interrupted due to signal loss as batteries become weak.

Although only an exemplary embodiment of the invention has been described in detail above, those skilled in the art will readily appreciate that many modifications are possible without materially departing from the novel teachings and advantages of this invention. Accordingly, all such modifications are intended to be included within the scope of this invention as defined in the following claims.

Having thereby described the subject matter of the present invention, it should be apparent that many substitutions, modifications, and variations of the invention are possible in light of the above teachings. It is therefore to be understood that the invention as taught and described herein is only to be limited to the extent of the breadth and scope of the appended claims.

I claim:

1. A cellular phone charging and powering system, comprising:

a base including a cradle for selectively receiving a cellular phone;

means for connecting the base to a power supply in a building;

means within the base for converting the power supply to output a voltage level sufficient to recharge and power the cellular phone;

a power cord disposed to interconnect the power converting means and the cellular phone; and an automatic rewind spool disposed within the base to pay out a length of the power cord when the phone is in use and take up the length of power cord when the phone is placed in the cradle.

2. The system of claim 1 wherein the base includes indicator lights identifying a phone condition.

3. The system of claim 2 wherein the base includes imprinted indicia corresponding to the phone condition.

* * * * *